United States Patent [19]

Balandin et al.

[54] HYDROSTATIC SUPPORT STRUCTURE AND LIQUID-CUSHION LOAD-CARRYING APPARATUS INCORPORATING THE SAME

[75] Inventors: Ivan Y. Balandin; Alexei A. Malyarchuk; Sergei I. Gerasimov; Lidia P. Suslova; Valery V. Alexeenko, all of Nikolaev; Ivan P. Kharchenko, Kiev; Vadim M. Sopryazhinsky, Kiev; Vladimir N. Kononenko, Kiev; Roman K. Stepanjuk, Kiev; Ivan N. Bereznikov, Kiev; Alexandr S. Bondarenko, Moscow, all of U.S.S.R.; Vladimir N. Andrianov, deceased, late of Nikolaev, U.S.S.R.; Svetlana A. Kamentseva, administrator, Moscow; Valery V. Andrianov, administrator, Nikolaev, both of U.S.S.R.

[73] Assignee: Nikolaevsky Korablestroitelny Institut Imeni Admirala S.O.Makarova, Nikolaev, U.S.S.R.

[21] Appl. No.: 351,409

[22] Filed: Feb. 23, 1982

[51] Int. Cl.³ ............................................. B60V 1/04
[52] U.S. Cl. ..................................... 180/124; 49/489; 180/125; 180/126
[58] Field of Search ............... 180/116, 124, 125, 126, 180/118, 119; 280/28.5; 104/23 FS, 134; 269/20; 92/110, 146; 49/485, 489, 493

[56] References Cited

U.S. PATENT DOCUMENTS

| 242,668 | 6/1881 | Maléi04 ................................. 23 |
| 2,132,060 | 10/1938 | Tremblay .............................. 49, |
| 3,545,770 | 12/1970 | Wheelock ............................. 49, |

FOREIGN PATENT DOCUMENTS

| 6609053 | 1/1968 | Netherlands ......................... 49, |
| 1377807 | 12/1974 | United Kingdom . |

OTHER PUBLICATIONS

"Ace Lifting Heavy Loads with Water Skate," Ho foil News, 1975, vol. 6, No. 3, pp. 12–14.

Primary Examiner—John A. Pekar
Assistant Examiner—D. Lynn Fugate
Attorney, Agent, or Firm—Fleit, Jacobson, Cohn & P

[57] ABSTRACT

A hydrostatic support structure wherein, to mov surface with a load disposed thereupon with respec a bearing surface, a liquid cushion is provided due feeding of a liquid into an inner space defined by bearing surface and a housing having a sealing mem Within the housing there is disposed a piston provi with its own sealing member which seals the gap tween the housing and the piston, whereas the sealing member defining the liquid cushion b formed along the perimeter of the inner space is rig secured to the housing of the support structure.

14 Claims, 11 Drawing Figures

HYDROSTATIC SUPPORT STRUCTURE AND LIQUID-CUSHION LOAD-CARRYING APPARATUS INCORPORATING THE SAME

BACKGROUND OF THE INVENTION

1. Field of the Invention

The present invention relates to means for carrying or conveying loads with the aid of a liquid cushion and more specifically is concerned with hydrostatic support structures and liquid-cushion load-carrying apparatus incorporating such support structures.

The proposed hydrostatic support structure may be used to convey heavy large-size loads for short distances on smooth horizontal or inclined bearing surface impermeable for the liquid used to form the liquid cushion.

This hydrostatic support structure may be employed, for example, to convey large products and structures of metal, concrete, etc. within shops and over the area of works. In some instances, apparatus with the proposed hydrostatic support structure can substitute for conventional load-handling equipment, such as cranes. The proposed hydrostatic support structure is most suitable to convey ship structures in erecting a ship hull on a slip-way and launch ships from inclined slipways.

2. Description of the Prior Art

The use of air-cushion load-carrying apparatus, such as the Rolair bearings produced by the U.S. company Rolair Systems Inc. (California), is well known in the art. The practice of operating such apparatus has shown them to be in many instances more economically efficient than conventional trailers or rail flatcars. Another significant advantage of the apparatus is that they allow the loads to be conveyed in any direction. Certain difficulties arise, however, as the weight of the load conveyed on an air-cushion apparatus increases. Employing apparatus with a low air pressure will entail a very high air consumption rate and hence a very high compressor power per ton of the load conveyed or, in other words, high power consumption for conveying every ton of load. On the other hand, increasing the air pressure deteriorates the stability of such apparatus and gives rise to problems in selecting materials for air cushion enclosures ("skirts") and ensuring the required load lift above the bearing surface.

To overcome the problems, the changeover from an air cushion to a liquid cushion, such as water one, has been started. A liquid cushion allows the specific pressure on a surface whereon a load is conveyed (the bearing surface) to be drastically increased, up to 20 kgf/cm$^2$ and over, with the result that the load-carrying capacity of a liquid-cushion apparatus will greatly exceed that of an air-cushion one of the same dimensions.

The liquid-cushion load-carrying apparatus typically comprise several hydrostatic support structures, high-pressure pumps, hoses to feed the liquid, instrumentation, and control equipment. The hydrostatic support structures (Often referred to as water bearings) constitute the most essential component of the apparatus; it is these hydrostatic support structures which will be described hereinafter.

The hydrostatic support structure of a liquid-cushion load-carrying apparatus, known as the Water Skate bearing ("Hoverfoil News", 1975, No. 3, pp. 12–14), comprises a housing which is a small sectional-construction platform or pallet and an elastic skirt secured to the pallet along the lower perimeter thereof. Water is pumped through holes in the housing into the space defined by the skirt until the water pressure exceeds the pressure of the load onto the pallet; at this moment, the water starts uniformly leaking at a certain rate under the skirt along the entire perimeter, thereby creating a bearing water film. Then the load is conveyed in the desired direction by applying a small traction effort. Water is supplied to the above-described hydrostatic support structure via a conventional flexible hose from a pump which can be spaced at the required distance from the support structure. Inasmuch as the use of only one support structure cannot fully ensure the stability of the load being conveyed, the weight of the load is distributed among at least three such support structures.

The operation of the above-described hydrostatic support structure involves a high water consumption rate (60 l/min at a load-carrying capacity of 60 t), which substantially restricts its practical application.

A much lower liquid consumption rate is offered by another conventional hydrostatic support structure disclosed in British Pat. No. 1,377,807. The housing of the hydrostatic support structure has a recess communicating with a source of liquid for the formation of a liquid cushion and a groove disposed concentrically with said recess and accommodating a flexible sealing member. The groove has a nonuniform cross-section diverging towards the bearing surface. The sealing member accommodated in the groove is hollow, has as well a nonuniform (essentially a pear-shaped) cross-section, and is filled with liquid in operation. The rate of liquid consumption in operation of this hydrostatic support structure is cut down owing to that after the support structure is brought beneath the load, liquid under pressure is supplied into the groove and sealing member when the formation of the cushion has not yet been started; the action of the liquid causes the sealing member to bear tightly against the bearing surface and thereby to isolate the recess for the formation of the liquid cushion from the surroundings, i.e. to produce a closed contour of the cushion. While the cushion is being formed, the pressure in the sealing member is maintained such as to prevent the liquid from leaking thereunder until the load is lifted to the required (within the capacity of the support structure) height. When the load supported on the support structure is being moved, the ratio between the liquid pressures in the cushion and in the sealing member is maintained such that a thin film of the liquid exists under the seal. The thickness of the film, which is controllable, is maintained such as to allow the load to be moved under the traction effort with an insignificant consumption of the cushion liquid.

The above-described hydrostatic support structure makes it possible to considerably reduce the rate of cushion liquid consumption in operation. However, the manufacture and operation of the support structure involve certain difficulties which mainly stem from that the sealing member defining the liquid cushion along the perimeter thereof is acted upon, via the housing, by a considerable part of the weight of the load; this restricts the possibilities for increasing the load-carrying capacity of the support structure and calls for the use of a high-strength and dependable sealing member of an adequately flexible material, i.e. eventually of a rather complex and cumbersome sealing member. Moreover, for the liquid film thickness to be maintained within a predetermined range, the groove accommodating the sealing member must be permanently communicating with the source of liquid supplied under a high pressure.

SUMMARY OF THE INVENTION

The principal object of the present invention is to increase the load-carrying capacity of a hydrostatic support structure of a liquid-cushion load-carrying apparatus without increasing the overall dimensions of the support structure.

Another important object of the invention is to simplify the construction of the hydrostatic support structure without increasing the liquid consumption rate.

Another object of the invention is to upgrade the operational dependability of the hydrostatic support structure.

Still another object of the invention is to simplify the procedures of forming a liquid cushion of a predetermined thickness and of varying the thickness during operation.

An important object of the invention is to reduce the liquid consumption rate in conveying a load.

A further object of the invention is to provide a self-contained hydrostatic support structure.

An additional object of the invention is to provide a self-contained conveying platform incorporating the hydrostatic support structure of the invention.

These and other objects of the invention are attained by providing a hydrostatic support structure of a liquid-cushion load-carrying apparatus wherein, to move a surface with a load disposed thereupon with respect to a bearing surface, a liquid cushion is provided by feeding a liquid into an inner space defined by the bearing surface and a housing of the support structure having a sealing member defining the liquid cushion along the perimeter of the inner space and wherein, according to the invention, the housing is provided with a piston having at its end a load to be conveyed, which piston has its own sealing member for sealing the gap between the housing and the piston, whereas the sealing member defining the liquid cushion being formed along the perimeter of the inner space is rigidly secured to the housing of the support structure.

Such a construction of the hydrostatic support structure of a liquid-cushion load-carrying apparatus allows the action of the load conveyed upon the housing sealing member defining the liquid cushion along the perimeter to be diminished to such an extent which makes it possible to use in said sealing member a face-type flexible sealing element without increasing the cushion liquid consumption rate; this greatly simplifies the construction of the sealing member and permits the load-carrying capacity of the support structure to be increased without increasing the overall dimensions thereof.

The sealing member defining the liquid cushion along the perimeter of the inner space is most preferably made of an elastic material and has the configuration of a ring with an annular collar on the inner surface of the ring along the bearing surface. Such a sealing element defining the liquid cushion along the perimeter is most simply secured by vulcanization for which purpose an annular groove should be made in the end face of the housing.

To provide for a quick and simple replacement of the sealing member defining the liquid cushion along the perimeter of the inner space in the event of its failure, it is advisable that the member has one more annular collar on its inner surface so that the cross-section of the sealing member is of a C-shaped configuration. In this case, an annular shoulder whereto the upper annular collar of the sealing member is secured by means of a flanged joint should be provided on the housing inner surface.

According to an alternative embodiment of the invention, for a convenient use of the sealing member defining the liquid cushion along the perimeter of the inner space, it is expedient that the member has two annular collars disposed so that the section of the member is of an essentially Z-shaped configuration. In this case, an annular shoulder whereto the upper annular collar is secured by means of a flanged joint should be provided on the housing outer surface.

For a better flexibility of the sealing member it is preferable that its annular collar has a tapered configuration in the axial section.

To ensure a reliable pressing of the sealing member, defining the liquid cushion along the perimeter of the inner space, against the bearing surface at the initial period of formation of the liquid cushion, at least one stop defining the extreme lower position of the piston with a shock-absorbing element in the form of at least one compression spring must be provided between the piston and the housing inner surface.

When the hydrostatic support structure is of large dimensions, it is advisable that the shock-absorbing element is made in the form of three compression springs equally spaced from one another along the perimeter of the piston.

For a convenient supply of liquid into the inner space, it is expedient that the hydrostatic support structure comprises a device for controlling the stroke of the piston having a shutoff valve mounted at the inlet to a pipe for feeding a liquid into the inner space and having a shutoff member connected to a spring-loaded rod interacting with a stop for closing the shutoff valve for forming the liquid cushion of a required height. To adjust the height of the liquid cushion, it is advisable that the rod of the shutoff valve be provided with a device for adjusting the length thereof.

Such an arrangement of the proposed support structure makes it possible in operation to disconnect from the supply line the inner space wherein the liquid cushion is formed, which makes the support structure self-contained and thereby greatly expands its operating potentialities.

It advisable to provide a liquid-cushion load-carrying apparatus wherein a frame is supported by hydrostatic support structures communicating with a source of liquid for the formation of the liquid cushion and wherein each hydrostatic support structure is constructed in accordance with any of the above-described embodiments and the frame is supported by the pistons of these hydrostatic support structures.

The above-mentioned and other objects and advantages of the present invention will now be explained by way of a detailed description of embodiments thereof with reference to the accompanying drawings.

It should be noted that the accompanying drawings are diagrammatical and serve only for illustration of the embodiments of the present invention without imposing any limits upon the dimensions of the components of the apparatus, the ratios between the dimensions of the components, etc.

DETAILED DESCRIPTION OF THE INVENTION

Figure 1:
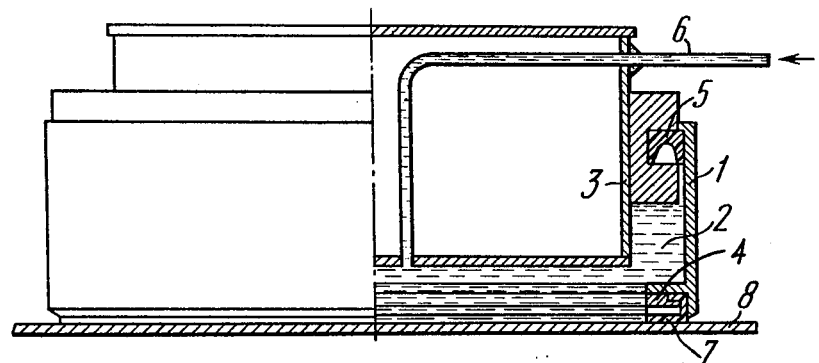
FIG. 1 is a side elevational view, partly in axial section, showing a hydrostatic support structure of a liquid-cushion load-carrying apparatus, according to the invention.

A hydrostatic support structure of a liquid-cushion load-carrying apparatus (FIG. 1) comprises a housing 1 defining an inner space 2 for the formation of a liquid cushion and a piston 3 disposed for a vertical movement in the inner space 2. A sealing member 4 defining the liquid cushion is rigidly secured to the housing 1 along the perimeter of the inner space 2. The piston 3 has its own sealing member 5 intended to hermetically seal the gap between the piston 3 and the housing 1. The hydrostatic support structure comprises also a pipe 6 adapted to supply the liquid which forms the liquid cushion; used as the liquid may be ordinary water. In winter, at low temperatures, low-freezing liquids should be employed, such as aqueous solutions of sodium chloride, antifreeze, or mineral oils.

To reduce the friction between a supporting surface 7 of the sealing member 4 and a bearing surface 8 whereon the hydrostatic support structure travels, it is advisable to employ aqueous solutions of soap or mineral oils as the liquid.

The bearing surface 8 should be smooth, without depressions and bulges. Insignificant irregularities of the bearing surface 8 are admissible when the liquid cushion is high enough. The bearing surface 8 may be the surface of steel or plastic sheets, concrete plates, asphalt covering, etc. Thus, 3 mm thick steel sheets laid onto any smooth floor capable of withstanding said load or onto pre-rammed ground may be used. Irregularities of the sheet surface within $\pm 3$ mm are tolerable.

Figure 2:
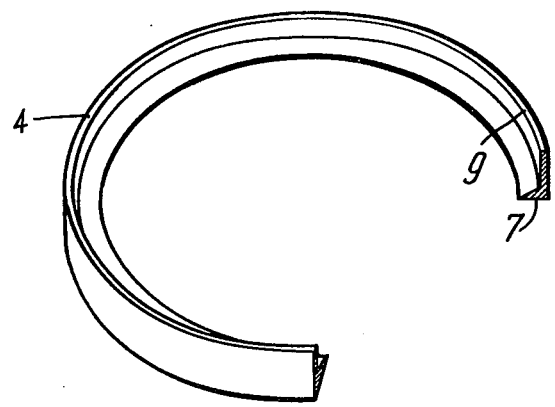
FIG. 2 is a perspective view, partly in axial section, showing a modification of the sealing member.
Figure 3:
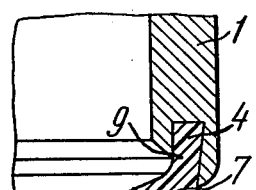
FIG. 3 is a fragmentary sectional view showing an alternative mode of fastening of the sealing member to the housing.

FIG. 2 illustrates the most simple modification of the sealing member 4 with an annular collar on its supporting surface facing the inner space. The member 4 may be made of rubber, plastic, or some other resilient material. The annular collar 9 on the inner surface of the member 4 is clearly seen in the Figure. Such a sealing member 4 is most simply secured by vulcanization, for which purpose an annular groove (FIG. 3) should be provided in the end face of the housing 1. Sealing member 4 includes an inwardly extending lip 4" that bears against bearing surface 8.

Figure 4:
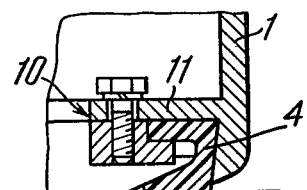
FIG. 4 is a fragmentary sectional view showing the fastening of a C-section sealing member to the housing.

FIG. 4 shows in section a fragment of the hydrostatic support structure wherein the sealing member 4 has one more annular collar so that it is of a C-shaped configuration. The sealing member 4 is secured by means of a flanged joint 10. In this case, an annular shoulder 11 whereto the upper annular collar of the member 4 is pressed by means of the flanged joint 10 is provided on the inner surface of the housing 1, defining the inner space 2. Such fastening makes it possible to quickly and simply replace the sealing member.

Figure 5:
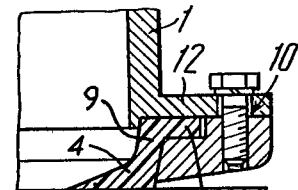
FIG. 5 is a fragmentary sectional view showing the fastening of a Z-section sealing member to the housing.

FIG. 5 illustrates another alternative modification of fastening of the sealing member which has two annular collars 9 and 9" disposed so that the sealing member is of an essentially Z-shaped configuration. In this case, an annular shoulder 12 whereto the top annular collar 9" of the member 4 is pressed by means of the flanged joint 10 is provided on the outer surface of the housing 1.

To make the sealing member 4 more resilient, it is advisable that its annular collar disposed along the supporting surface has a tapered configuration.

Figure 6:
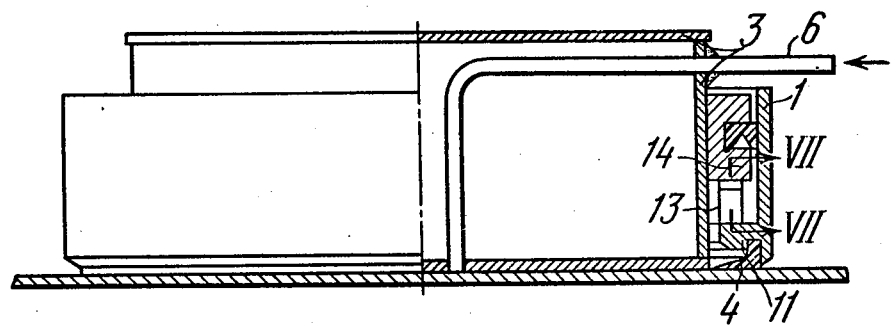
FIG. 6 is a side elevational view, partly in axial section, showing modification of the hydrostatic support structure incorporating a spring between the piston and the housing.

FIG. 6 shows a modification of the proposed hydrostatic support structure with stops defining the extreme lower position of the piston 3, disposed between the housing 1 and the piston 3. According to this modification, the support structure is provided with a shock-absorbing element which may comprise one compression spring 13 or a plurality of such springs.

There may be provided only one stop as shown in FIG. 6. This stop is formed by the annular shoulder 11 provided on the inner surface of the housing 1 and by an annular shoulder 14 provided on the outer surface of the piston 3. In this case one or more compression springs are installed between these shoulders. The stops may be variously otherwise constructed. For example, if there is a sealing member for sealing the gap between the housing and the piston, the stops are made in the form of protrusions on the piston and respective protrusions on the inner surface of the housing. The annular shoulder 11 may function as the latter protrusions. Proceeding from the data of the accompanying drawings, the latter modification of the proposed support structure can be easily constructed by those skilled in the art. Therefore this modification is not illustrated by a separate Figure of the drawings.

Figure 7:
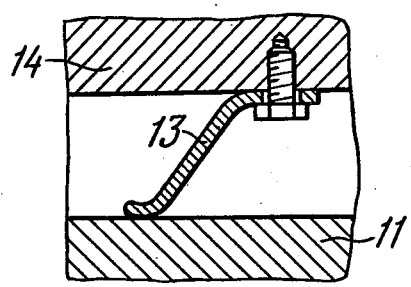
FIG. 7 is a sectional view taken along the line VII—VII in FIG. 6 and showing an alternative mode of fastening of the compression spring to the piston.
Figure 8:
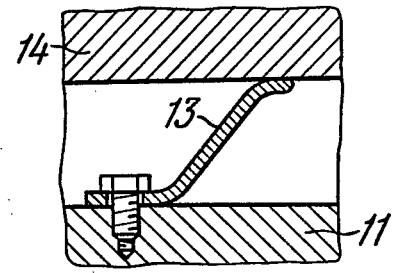
FIG. 8 is a sectional view showing an alternative mode of fastening of the compression spring to the housing.

These modifications of the proposed hydrostatic support structure of a liquid-cushion load-carrying apparatus ensure a reliable pressing of the sealing member 4 against the bearing surface 8 at the initial period of formation of the liquid cushion, which reduces both the liquid consumption rate and the time required to form the liquid cushion. The compression spring 13 may be a coiled one installed so as to encompass the piston 3. When the support structure is of large dimentions, it is advisable to install not less than three compression springs 13, equally spaced from one another, between the shoulders 11 and 14. The springs may be plate-type ones and may be secured either to the shoulder 14 of the piston 3 (FIG. 7) or to the shoulder 11 of the housing 1 (FIG. 8).

Figure 9:
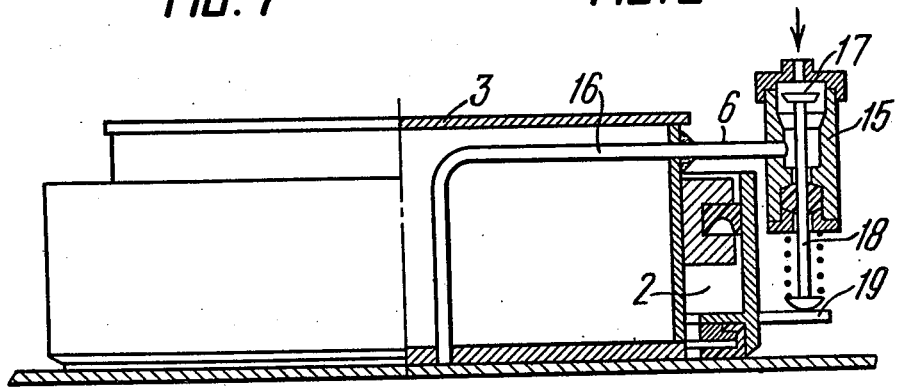
FIG. 9 is a side elevational view, partly in axial section, of a modification of the hydrostatic support structure with a shutoff valve.

FIG. 9 illustrates a modification of the hydrostatic support structure incorporating a device for controlling the stroke of the piston 3; this device is a shutoff valve 15 (for clarity, the valve is enlarged with respect to the support structure as a whole), installed at the inlet to the pipe 6 secured to the piston 3 and communicating with the inner space 2 via a passage 16 provided in the piston 3. The construction of the valve 15 is such that its shutoff member 17 comprising a spring-loaded rod 18 which in the working position of the support structure contact a stop 19 secured to the housing 1 closes the valve when the desired height of the liquid cushion has been reached. Providing the rod 18 of the shutoff valve 15 with a threaded end piece 20 (FIG. 10) makes the height of the liquid cushion easily adjustable.

Figure 10:
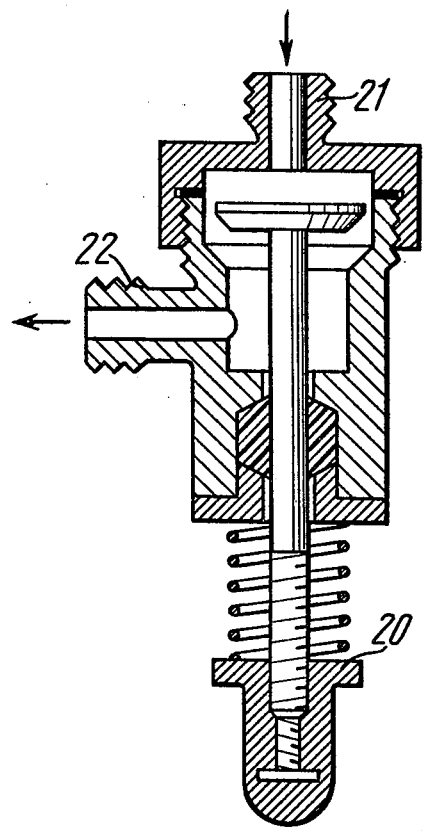
FIG. 10 is a sectional elevational view of a modification of the shutoff valve with a threaded end piece of the rod.

FIG. 10 shows also an inlet nozzle 21 and an outlet nozzle 22 of the shutoff valve 15. In the modification of the hydrostatic support structure incorporating the shutoff valve 15, the process of formation of the liquid cushion of the desired height proceeds automatically. In addition, obviating the need for a permanent communication of the inner space 2 with the supply line allows the support structure to be self-contained; to accomplish this, a shutoff valve (not shown) is to be installed between the inlet of the valve 15 and the supply line. The possibility of making the support structure self-contained greatly expands its operating potentialities.

Figure 11:
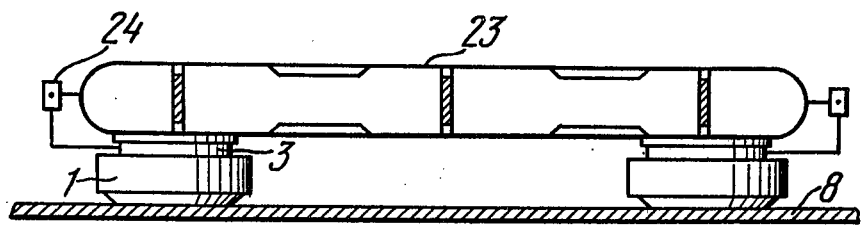
FIG. 11 is a sectional elevational view of the liquid-cushion load-carrying apparatus incorporating the hydrostatic support structure of the invention.

FIG. 11 shows a liquid-cushion load-carrying apparatus wherein the hydrostatic support structure of the invention is utilized. The apparatus comprises a frame 23 mounted on the above-described support structures which communicate with a source of liquid for the formation of a liquid cushion. Serving as the source of liquid may be a hydraulic accumulator. The drawing shows an alternative embodiment of the invention wherein the frame 23 is a hollow body to be filled with a liquid used for the formation of the liquid cushion.

In this case the frame 23 functions as a hydraulic accumulator. Such a construction of the frame makes the apparatus more self-contained.

FIG. 11 also shows valves 24 for controlling the supply of the liquid to the hydrostatic support structures.

The above-described hydrostatic support structure of the liquid cushion load-carrying apparatus functions in the following way.

The hydrostatic support structure is placed onto the bearing surface 8 underneath the load to be conveyed. The piston 3 is in the extreme lower position and via the compression springs 13 presses the housing 1 with the sealing member 4 against the bearing surface 8 (FIGS. 6, 9). The nozzle 21 of the shutoff valve 15 is by means of a valve (not shown) connected to a pressure line which supplies liquid under pressure into the passage 16. The liquid forced in causes the piston 3 with the load to lift, with the result that a liquid cushion (FIG. 1) defined along the perimeter by the sealing member 4 and the housing 1 is formed between the bottom face of the piston 3 and the bearing surface 8. As the load has been lifted to the desired height, the supply of the liquid into the inner space 2 is shut off, and then the pressure line is disconnected from the shutoff valve 15. The hydrostatic support structure is thus ready to convey the load. After the load has been conveyed to the point of destination, the liquid from the inner space 2 is allowed to escape, with the result that the piston 3 gradually descends and comes to the extreme lower initial position (FIG. 6).

A specific feature of operation of the liquid-cushion load-carrying apparatus wherein the hydrostatic support structure is used consists in that its hollow frame 23 is filled with the working liquid and compressed gas before operation.

The use of the proposed hydrostatic support structure in liquid-cushion load-carrying apparatus provides a means for considerably increasing their load-carrying capacity without increasing their dimensions and weight. The proposed hydrostatic support structure of the invention differs from similar prior art devices by a simplicity of the construction and fastening of the sealing member defining the liquid cushion, which makes it possible in service to easily replace said members in the event of their failure. The features of the construction of the support structure make it convenient in operation.

It is to be understood that the present invention is not intended to be limited by the particular embodiments thereof, described and shown hereinabove, and that various other modifications and embodiments of the hydrostatic support structure of a liquid-cushion load-carrying apparatus are possible without departing from the spirit and scope of the invention as defined in the claims.

We claim:

1. In a liquid-cushion load-carrying apparatus for moving a load along a bearing surface, the apparatus having a framework for the load to be disposed thereon, a source of liquid to provide a liquid cushion, and at least one hydrostatic support structure comprising:
    a housing which is disposed on said bearing surface and which has an inner surface and an outer surface;
    an inner space defined by said inner surface of said housing and by said bearing surface and intended to be fed with a liquid from said source of liquid for the formation of an operative liquid cushion;
    a piston disposed within said housing and having an end face disposed in an opposite relationship with said bearing surface and on which end face a load being conveyed is disposed;
    a first sealing member rigidly secured to said housing adjacent said bearing surface and defining a liquid cushion being formed along the perimeter of said inner space adjacent said bearing surface;
    a second sealing member disposed on said piston so as to seal the gap between said housing and said piston; and
    at least one stop defining the extreme lower position of said piston and positioned between said piston and said housing and serving to restrict the downward movement of said piston, and a shock-absorbing element of said stop made in the form of at least one compression spring disposed on said stop so as to provide for a smooth downward movement of said piston.

2. In a liquid-cushion load-carrying apparatus for moving a load along a bearing surface, the apparatus having a framework for the load to be disposed thereon, a source of liquid to provide a liquid cushion, and at least one hydrostatic support structure comprising:
    a housing which is disposed on said bearing surface and which has an inner surface and an outer surface;
    an inner space defined by said inner surface of said housing and by said bearing surface and intended to be fed with a liquid from said source of liquid for the formation of an operative liquid cushion;
    a piston disposed within said housing and having an end face disposed in an opposite relationship with said bearing surface and on which end face a load being conveyed is disposed;

a first sealing member rigidly secured to said housing adjacent said bearing surface and defining the liquid cushion being formed along the perimeter of said inner space adjacent said bearing surface, said first sealing member made in the form of a ring provided with a supporting surface facing said bearing surface and with a first annular collar on said supporting surface;

a second sealing member disposed on said piston so as to seal the gap between said housing and said piston; and at least one stop defining the extreme lower position of said piston and disposed between said piston and said housing and serving to restrict the downward movement of said piston, and a shock-absorbing element of said stop, made in the form of at least one compression spring disposed on said stop so as to provide for a smooth downward movement of said piston.

3. In a liquid-cushion load-carrying apparatus for moving a load along a bearing surface, the apparatus having a framework for the load to be disposed thereon, a source of liquid to provide a liquid cushion, and at least one hydrostatic support structure comprising:

a housing which is disposed on said bearing surface and which has an inner surface and an outer surface;

an inner space defined by said inner surface of said housing and by said bearing surface and intended to be fed with a liquid from said source of liquid for the formation of an operative liquid cushion;

a piston disposed within said housing and having an end face disposed in an opposite relationship with said bearing surface and on which end face a load being conveyed is disposed;

a first sealing member rigidly secured to said housing adjacent said bearing surface and defining the liquid cushion being formed along the perimeter of said inner space adjacent said bearing surface, said first sealing member made in the form of a ring provided with a supporting surface facing said bearing surface and with a first annular collar on said supporting surface;

a second sealing member disposed on said piston so as to seal the gap between housing and said piston;

at least one stop defining the extreme lower position of said piston and disposed between said piston and said housing and serving to restrict the downward movement of said piston, and a shock-absorbing element of said stop, made in the form of three compression springs equally spaced from one another along the perimeter of said piston.

4. In a liquid-cushion load-carrying apparatus for moving a load along a bearing surface, the apparatus having a framework for the load to be disposed thereon, a source of liquid to provide a liquid cushion, and at least one hydrostatic support structure comprising:

a housing which is disposed on said bearing surface and which has an inner surface and an outer surface;

an inner space defined by said inner surface of said housing and by said bearing surface and intended to be fed with a liquid from said source of liquid for the formation of an operative liquid cushion;

a piston disposed within said housing and having an end face disposed in an opposite relationship with said bearing surface and on which end face a load being conveyed is disposed;

a first sealing member rigidly secured to said housing adjacent said bearing surface and defining the liquid cushion being formed along the perimeter of said inner space adjacent said bearing surface, said first sealing member made in the form of a ring having a supporting surface facing said bearing surface, and a first annular collar on said supporting surface, said first sealing member including an inwardly directed lip adjacent the bearing surface;

a second sealing member disposed on said piston so as to seal the gap between said housing and said piston; and at least one stop defining the extreme lower position of said piston and disposed between said piston and said housing and serving to restrict the downward movement of said piston, and a shock-absorbing element of said stop, made in the form of at least one compression spring disposed on said stop so as to provide for a smooth downward movement of said piston.

5. A hydrostatic support structure in accordance with claim 4, comprising a device for controlling the stroke of said piston, having a shutoff valve mounted at the place where a liquid is fed into said inner space from said source of liquid; a shutoff member of said shutoff valve; a spring-loaded rod connected with said shutoff member and interacting with said stop so as to close said shutoff valve for the formation of the liquid cushion of a required height within said inner space.

6. A hydrostatic support structure in accordance with claim 5, wherein said rod has an adjustable length.

7. In a liquid-cushion load-carrying apparatus for moving a load along a bearing surface, the apparatus having a framework for the load to be disposed thereon, a source of liquid to provide a liquid cushion, and at least one hydrostatic support structure comprising:

a housing which is disposed on said bearing surface and which has an inner surface and an outer surface;

an inner space defined by said inner surface of said housing and by said bearing surface and intended to be fed with a liquid from said source of liquid for the formation of an operative liquid cushion;

a piston disposed within said housing and having an end face disposed in an opposite relationship with said bearing surface and on which end face a load being conveyed is disposed;

a first sealing member rigidly secured to said housing adjacent said bearing surface and defining the liquid cushion being formed along the perimeter of said inner space adjacent said bearing surface, said first sealing member made in the form of a ring having a supporting surface facing said bearing surface, and a first annular collar on said supporting surface, said first sealing member including an inwardly directed lip adjacent the bearing surface;

a second sealing member disposed on said piston so as to seal the gap between said housing and said piston; and at least one stop defining the extreme lower position of said piston and disposed between said piston and said housing and serving to restrict the downward movement of said piston, and a shock-absorbing element of said stop, made in the form of three compression springs equally spaced from one another along the perimeter of said piston.

8. A hydrostatic support structure in accordance with claim 2, comprising a device for controlling the stroke of said piston, having a shutoff valve mounted at the place where a liquid is fed into said inner space from said source of liquid; a shutoff member of said shutoff valve; a spring-loaded rod connected with said shutoff member and interacting with said stop so as to close said shutoff valve for the formation of the liquid cushion of a required height within said inner space.

9. In a liquid-cushion load-carrying apparatus for moving a load along a bearing surface, the apparatus having a framework for the load to be disposed thereon, a source of liquid to provide a liquid cushion, and at least one hydrostatic support structure comprising:
- a housing which is disposed on said bearing surface and which has an inner surface and an outer surface;
- an inner surface defined by said inner surface of said housing and by said bearing surface and intended to be fed with a liquid from said source of liquid for the formation of an operative liquid cushion;
- a piston disposed within said housing and having an end face disposed in an opposite relationship with said bearing surface and on which end face a load being conveyed is disposed;
- a first sealing member ridgidly secured to said housing adjacent said bearing surface and defining the liquid cushion being formed along the perimeter of said inner space adjacent said bearing surface, said first sealing member made in the form of a ring having a supporting surface facing said bearing surface, and a first annular collar on said supporting surface, said first sealing member including an inwardly directed lip adjacent the bearing surface and a second annular collar so that said first sealing member is of a C-shaped configuration in cross-section;
- said inner surface of said housing where said first sealing member is mounted having an annular shoulder and a flanged joint to secure said upper annular collar to said annular shoulder;
- a second sealing member disposed on said piston so as to seal the gap between said housing and said piston; and
- at least one stop defining the extreme lower position of said piston and disposed between said piston and said housing and serving to restrict the downward movement of said piston, and a shock-absorbing element of said stop, made in the form of at least one compression spring disposed on said stop so as to provide for a smooth downward movement of said piston.

10. A hydrostatic support structure in accordance with claim 9, comprising a device for controlling the stroke of said piston, having a shutoff valve mounted at the place where a liquid is fed into said inner space from said source of liquid; a shutoff member of said shutoff valve; a spring-loaded rod connected with said shutoff member and interacting with said stop so as to close said shutoff valve for the formation of the liquid cushion of a required height within said inner space.

11. A hydrostatic support structure in accordance with claim 10, wherein said rod has an adjustable length.

12. In a liquid-cushion load-carrying apparatus for moving a load along a bearing surface, the apparatus having a framework for the load to be disposed thereon, a source of liquid to provide a liquid cushion, and at least one hydrostatic support structure comprising:
- a housing which is disposed on said bearing surface and which has an inner surface, an outer surface, and a flanged joint;
- an inner surface defined by said inner surface of said housing and by said bearing surface and intended to be fed with a liquid from said source of liquid for the formation of an operative liquid cushion;
- a piston disposed within said housing and having an end face disposed in an opposite relationship with said bearing surface and on which end face a load being conveyed is disposed;
- a first sealing member rigidly secured to said housing adjacent said bearing surface and defining the liquid cushion being formed along the perimeter of said inner space adjacent said bearing surface, said first sealing member made in the form of a ring having a supporting surface facing said bearing surface, and a first annular collar on said supporting surface, said first sealing member including an inwardly directed lip adjacent the bearing surface, and including a second annular collar so that said first sealing member is of a Z-shaped configuration in cross-section, said outer surface of said housing where said first sealing member is mounted having an annular shoulder whereto said upper annual collar is secured by means of said flanged joint;
- a second sealing member disposed on said piston so as to seal the gap between said housing and said piston; and
- at least one stop defining the extreme lower position of said piston and disposed between said piston and said housing and serving to restrict the downward movement of said piston, and a shock-absorbing element of said stop, made in the form of at least one compression spring disposed on said stop so as to provide for a smooth downward movement of said piston.

13. A hydrostatic support structure in accordance with claim 12, comprising a device for controlling the stroke of said piston, having a shutoff valve mounted at the place where a liquid is fed into said inner space from said source of liquid; a shutoff member of said shutoff valve; a spring-loaded rod connected with said shutoff member and interacting with said stop so as to close said shutoff valve for the formation of the liquid cushion of a required height within said inner space.

14. A hydrostatic support structure in accordance with claim 13, wherein said rod has an adjustable length.

* * * * *